United States Patent [19]

do Espirito Santo

[11] Patent Number: 5,115,352
[45] Date of Patent: May 19, 1992

[54] DOUBLE EXTERNAL REAR VIEW MIRROR ASSEMBLY FOR VEHICLES

[76] Inventor: Antonio Ferreira do Espirito Santo, Almirante Tamandare Street 85, Sao Bernardo do Campo, Sao Paulo, Brazil

[21] Appl. No.: 462,796

[22] Filed: Jan. 10, 1990

[30] Foreign Application Priority Data

Jan. 10, 1989 [BR] Brazil ................... 8900142

[51] Int. Cl.$^5$ ................ G02B 5/08; B60R 1/06
[52] U.S. Cl. .................... 359/855; 359/864; 359/865; 359/874; 359/877
[58] Field of Search ............ 350/612, 616, 623, 624, 350/625, 626, 627, 633, 634, 636, 637

[56] References Cited

U.S. PATENT DOCUMENTS

| 4,022,520 | 10/1977 | Scifres ................... 350/616 |
| 4,190,326 | 2/1980 | Brodbeck ................ 350/636 |
| 4,268,120 | 5/1981 | Jitsumori ................ 350/624 |
| 4,283,117 | 8/1981 | Ellis ..................... 350/625 |

FOREIGN PATENT DOCUMENTS

| 0287181 | 10/1988 | European Pat. Off. ........... 350/637 |
| 2409748 | 9/1975 | Fed. Rep. of Germany ...... 350/627 |
| 2628042 | 9/1989 | France .................... 350/634 |
| 0186443 | 7/1989 | Japan ..................... 350/612 |

Primary Examiner—Bruce Y. Arnold
Assistant Examiner—R. D. Shafer
Attorney, Agent, or Firm—Michael J. Striker

[57] ABSTRACT

A double external rear view mirror assembly for motor vehicles and comprising a frame that supports a comparatively large flat mirror and a comparatively small convex mirror, and two actuators for pivoting the two mirrors, respectively, about their respective longitudinal and transverse axes with each of the actuators including two electric motors mounted on the frame base, a support for supporting a respective mirror in the frame, and a transmission element that connects the two motors with the support for the respective mirror to pivot the same about its longitudinal and transverse axes.

3 Claims, 1 Drawing Sheet

DOUBLE EXTERNAL REAR VIEW MIRROR ASSEMBLY FOR VEHICLES

BACKGROUND OF THE INVENTION

The invention relates to a double external rear view mirror assembly for vehicles. Double external rear view mirror assemblies which mostly are used in buses, trucks and the like, are known. These double external rear view mirror assemblies include assemblies in which a comparatively large mirror is movable and a comparatively small mirror is fixed, and assemblies in which both mirrors are movable, generally by hand. However, in both types of double external rear view mirror assemblies, the adjustment range is small, and the adjustment itself is inconvenient for a vehicle operator to execute. Besides, these double rear view mirror assemblies are very unstable.

SUMMARY OF THE INVENTION

The object of the invention is to provide a double external hand-adjustable rear view mirror assembly for a vehicle which can be easily adjusted by a vehicle operator.

Another object of the invention is a vehicle double external rear view mirror assembly that has a relatively wide range of regulation for both mirrors.

A further object of the invention is a vehicle double external rear view mirror assembly that is stable during vehicle movement.

The object of the invention is achieved by providing a double rear view mirror assembly that comprises a comparatively large flat mirror and a comparatively small convex mirror which are mounted in a common frame and are movable by electric motors controlled by a vehicle operator from inside of the vehicle cabin.

The present invention both as to its construction so to its mode of operation, together with additional objects and advantages thereof, will be best understood from the following detailed description of the preferred embodiment with reference to the the accompanying drawings.

BRIEF DESCRIPTION OF THE DRAWINGS

FIGS. 5 and 6 are cross-sectional views showing further details of the inventive double external rear view mirror.

DESCRIPTION OF THE PREFERRED EMBODIMENT

Figure 1:
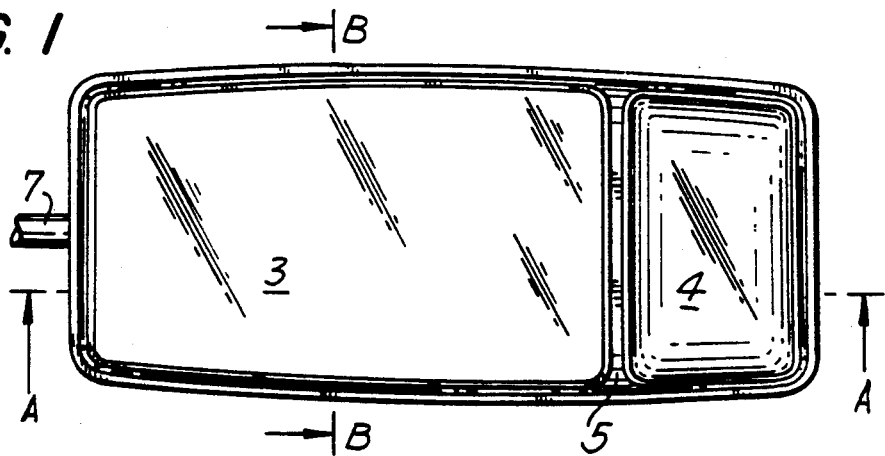
FIG. 1 shows a front view of a double external rear view mirror assembly according to the invention.
Figure 2:
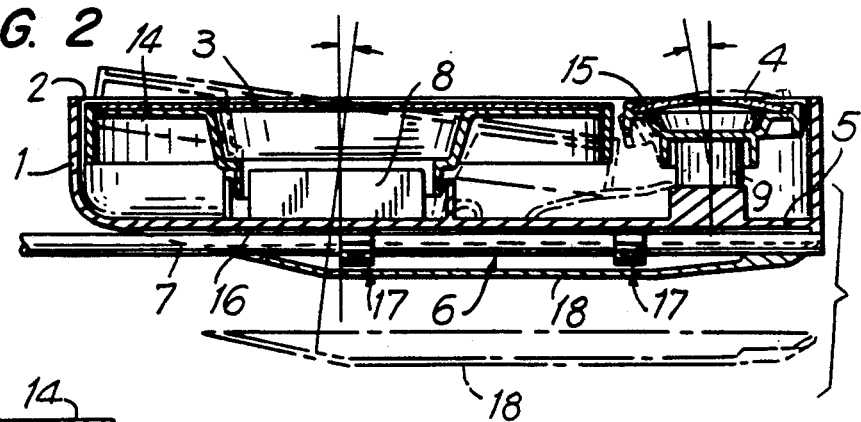
FIG. 2 shows a cross-sectional view of the assembly shown in FIG. 1 along line A—A.
Figure 3:
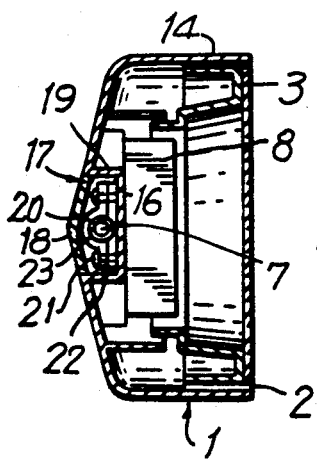
FIG. 3 shows a cross-sectional view of the assembly shown in FIG. 1 along line B—B.
Figure 4:
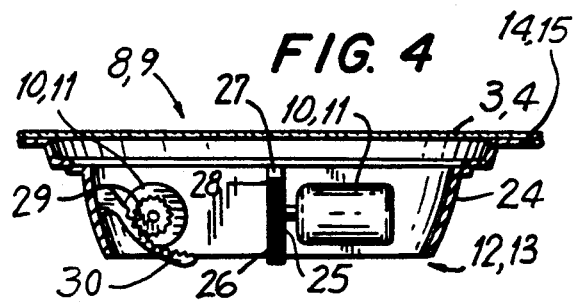
FIG. 4 shows a cross-sectional view of a portion of a mirror actuating mechanism.

FIG. 1 shows a double external rear view mirror assembly comprising a substantially prismatic and rectangular frame 1 having a front opening 2 in which a comparatively large flat mirror 3 and a comparatively small convex mirror 4 are mounted. Both mirrors are pivotable about their respective horizontal and vertical axes. The base 5 of the frame 1 is connected to a bracket 6 of a support assembly 7 by which the mirror assembly is mounted on a vehicle body. The double external rear view mirror assembly further comprises actuators 8 and 9 for adjusting the mirrors 3 and 4, respectively. Each of the actuators 8 and 9 comprises a pair of electric motors 10 and 11 mounted on the frame base 5. The electric motors 10 and 11 are connected by transmission elements 12 and 13 with support 14 for the comparatively large flat mirror 3 and support 15 for the comparatively small convex mirror 4, respectively.

The bracket 6 for the support assembly 7 has a bottom portion 16 arranged centrally at the bottom of the base 5 and in which connection elements 17 of the support 7 are engaged. The bottom portion 16 is closed by a removable cover 18. Each connection element 17 comprises a fixed base 19 having a central clip 20. The base 19 supports a locking bar 22. The locking bar 22 is connected to the base 19 by screws 21. A second clip 23 is mounted on the base 19 in spaced relationship relative to clip 20. A portion of the support assembly 7 is received and fastened in the space between the two clips.

The frame 1 and mirrors 3 and 4 generally have a shape that is best harmonized with the vehicle model.

The transmission elements 12 and 13 that connect the motors 10 and 11 with supports 14 and 15, respectively, may generally include a ring 24 having an upper edge on which a respective support 14 or 15 for the comparatively large flat mirror 3 or comparatively small and convex mirror 4, respectively, is mounted. The ring 24 is pivotally supported in the frame by support means 28. Motors of a respective pair of motors are mounted on the bottom of the base 5 with their respective axes extending transverse to each other. One of the respective pair of motors whose axis extends parallel to the longitudinal axis of the respective mirror, has at an end of the output shaft thereof a pinion 25 that engages an arched rack 26 extending transverse to the axis of the one of the motors. One of the end portions of the arched rack 26 is connected with the upper portions 27 of the respective ring 24. The other of the respective pair of motors, whose axis extends transverse to the axis of the one motor, and parallel to the transverse axis of the mirror, has at an end of the output shaft thereof a gear 29. The gear 29 engages a second arched rack 30 that is mounted transverse relative to the rack 26 and is connected at an end thereof to the ring 24 at a point displaced by 90° with respect to the point at which the rack 26 is connected with the ring 24.

The control of actuators 8 and 9 can be effected from inside of the cabin of the vehicle.

While the invention has been illustrated and described as embodied in a double external rear view mirror, it is not intended to be limited to the details shown, since various modifications and structural changes may be made without departing in any way from the spirit of the present invention.

What is claimed as new and desired to be protected by Letters Patent is set forth in the appended claims.

What is claimed is:

1. A double external rear view mirror assembly for motor vehicles, comprising a substantially prismatic frame including a base having inner and outer surfaces; a comparatively large flat mirror and a comparatively small convex mirror supported in said frame, each mirror having longitudinal and transverse axis; and two actuators arranged in said frame for moving said large and small mirrors, respectively, about their respective longitudinal and transverse axes, each of said two actuators including a pair of electric motors for moving a respective mirror about its longitudinal and transverse axes, respectively, and mounted on the inner surface of said base, a support for supporting said respective mirror in said frame, and transmission means for connecting said pair of electric motors with said support to move said support with said respective mirror about the longitudinal and transverse axes of said respective mirror, said pair of electric motors including a first motor having an axis and a first output shaft, and mounted on said inner surface of said base such that the axis of said first motor extends parallel to the longitudinal axis of said respective mirror, and a second motor having an axis and a second output shaft, and mounted on said inner surface of said base such that the axis of said second motor extends parallel to the transverse axis of said respective mirror, said transmission means comprising a ring member having an upper edge for fixedly supporting said support for said respective mirror and surrounding said first and second motors, first and second arched racks extending substantially perpendicular to the longitudinal and transverse axes of said respective mirror, respectively, and fixedly connected to said ring member, and first and second gears mounted on said first and second output shafts of said first and second motors, respectively, and engaging said first and second arched racks, respectively, for pivoting said ring member together with said support for said respective mirror about the longitudinal and transverse axes of said respective mirror, respectively.

2. A double external rear view mirror assembly as set forth in claim 1, further comprising means for attaching said frame to a vehicle body, said attaching means including a mounting assembly for attaching said frame to the vehicle body and a bracket attached to said outer surface of said base for connecting said frame with said mounting assembly.

3. A double external rear view mirror assembly as set forth in claim 2, wherein said bracket includes a bottom extending centrally along said outer surface of said base and connection means for connecting said mounting assembly to said bottom of said bracket.

* * * * *